United States Patent
Banerjee

(10) Patent No.: US 9,186,872 B2
(45) Date of Patent: Nov. 17, 2015

(54) MULTI-LAYER FLEXIBLE SHEET AND METHOD THEREOF

(75) Inventor: Mrinal Kanti Banerjee, Mumbai (IN)

(73) Assignee: Essel Propack Ltd. (IN)

( * ) Notice: Subject to any disclaimer, the term of this patent is extended or adjusted under 35 U.S.C. 154(b) by 1014 days.

(21) Appl. No.: 12/741,713

(22) PCT Filed: Nov. 6, 2008

(86) PCT No.: PCT/IN2008/000758
§ 371 (c)(1),
(2), (4) Date: May 6, 2010

(87) PCT Pub. No.: WO2009/087659
PCT Pub. Date: Jul. 16, 2009

(65) Prior Publication Data
US 2010/0266828 A1    Oct. 21, 2010

(30) Foreign Application Priority Data

Nov. 7, 2007  (IN) .................. 2224/MUM/2007

(51) Int. Cl.
*B32B 15/082* (2006.01)
*B32B 15/095* (2006.01)
(Continued)

(52) U.S. Cl.
CPC ............. *B32B 27/08* (2013.01); *B32B 27/16* (2013.01); *B32B 27/306* (2013.01); *B32B 27/32* (2013.01);
(Continued)

(58) Field of Classification Search
CPC .... B32B 15/082; B32B 15/085; B32B 15/09; B32B 15/095; B65D 1/32; Y10T 428/1359; Y10T 428/31678
USPC .............. 428/35.3, 35.8, 35.9, 457, 461, 462, 428/458
See application file for complete search history.

(56) References Cited

U.S. PATENT DOCUMENTS 4,377,616 A * 3/1983 Ashcraft et al. .............. 428/213
4,888,237 A   12/1989 Balloni et al.
(Continued)

FOREIGN PATENT DOCUMENTS

DE    3419255     2/1985
EP    0096581    12/1983
(Continued)

OTHER PUBLICATIONS

International Preliminary Report on Patentability dated Jan. 25, 2010 for International Application No. PCT/IN2008/000758.
(Continued)

*Primary Examiner* — Walter B Aughenbaugh
(74) *Attorney, Agent, or Firm* — Schwegman Lundberg & Woessner, P.A.

(57) ABSTRACT

The present invention provides a method for manufacturing a multilayer flexible sheet and a multilayer flexible sheet. The method for manufacturing a multilayer sheet comprises steps of metalizing atleast one of the surfaces of a core polymer layer; priming the metalized surface of the core polymer layer with a primer; extrusion laminating the primed surface of the core polymer layer with polyolefin and/or co-polymer of polyolefin; and co-extruding first heat sealable layer over the extrusion laminated layer. The multilayer polymer sheet of the present invention atleast comprises a core layer having one of the polymer sides plasma treated, a metal layer deposited on the plasma treated side of the core layer, a primer layer applied on the metalized surface of the core layer, an extrusion polymer lamination layer of poiyolefin and/or co¬ polymer of polyolefin and a heat sealable layer on the extrusion polymer lamination layer.

19 Claims, 2 Drawing Sheets

(51) Int. Cl.
*B32B 1/02* (2006.01)
*B32B 27/08* (2006.01)
*B32B 27/16* (2006.01)
*B32B 27/30* (2006.01)
*B32B 27/32* (2006.01)
*B32B 27/34* (2006.01)
*B32B 27/36* (2006.01)
*B32B 37/02* (2006.01)
*B32B 37/15* (2006.01)
*B32B 38/00* (2006.01)

(52) U.S. Cl.
CPC ............... *B32B 27/327* (2013.01); *B32B 27/34* (2013.01); *B32B 27/36* (2013.01); *B32B 15/082* (2013.01); *B32B 15/095* (2013.01); *B32B 37/02* (2013.01); *B32B 37/153* (2013.01); *B32B 38/0008* (2013.01); *B32B 38/145* (2013.01); *B32B 2038/0092* (2013.01); *B32B 2250/24* (2013.01); *B32B 2255/10* (2013.01); *B32B 2255/205* (2013.01); *B32B 2255/26* (2013.01); *B32B 2255/28* (2013.01); *B32B 2274/00* (2013.01); *B32B 2307/31* (2013.01); *B32B 2307/406* (2013.01); *B32B 2307/518* (2013.01); *B32B 2307/546* (2013.01); *B32B 2307/75* (2013.01); *B32B 2310/14* (2013.01); *B32B 2439/40* (2013.01); *B32B 2553/00* (2013.01); *B32B 2597/00* (2013.01); *Y10T 428/31678* (2015.04); *Y10T 428/31681* (2015.04); *Y10T 428/31692* (2015.04)

(56) References Cited

U.S. PATENT DOCUMENTS

| | | | | |
|---|---|---|---|---|
| 5,153,074 | A | * | 10/1992 | Migliorini ............... 428/463 |
| 5,194,318 | A | * | 3/1993 | Migliorini et al. ........... 428/215 |
| 5,981,079 | A | * | 11/1999 | Mount et al. ............... 428/461 |
| 6,013,353 | A | * | 1/2000 | Touhsaent ............... 428/203 |
| 6,410,124 | B1 | * | 6/2002 | Peet ............... 428/215 |
| 6,503,635 | B1 | * | 1/2003 | Kong et al. ............... 428/461 |
| 6,770,361 | B2 | * | 8/2004 | Kong ............... 428/354 |
| 6,773,818 | B2 | * | 8/2004 | Cretekos et al. ............... 428/461 |
| 6,844,077 | B2 | * | 1/2005 | Squier et al. ............... 428/457 |
| 7,288,304 | B2 | * | 10/2007 | Squier ............... 428/35.7 |
| 7,361,391 | B2 | * | 4/2008 | Rassouli et al. ............... 428/34.6 |
| 7,371,465 | B2 | * | 5/2008 | Pellingra et al. ............... 428/461 |
| 2002/0182435 | A1 | | 12/2002 | Migliorini et al. |
| 2003/0172559 | A1 | * | 9/2003 | Squier ............... 40/299.01 |
| 2004/0105994 | A1 | | 6/2004 | Lu et al. |
| 2004/0115457 | A1 | | 6/2004 | Kong |
| 2007/0110997 | A1 | * | 5/2007 | Aguirre ............... 428/349 |

FOREIGN PATENT DOCUMENTS

| | | |
|---|---|---|
| EP | 0365326 | 4/1990 |
| FR | 2126123 | 10/1972 |
| JP | 56046746 | 4/1981 |
| JP | 04201334 | 7/1992 |
| WO | WO97/25196 | 7/1997 |
| WO | WO98/32597 | 7/1998 |
| WO | WO00/58088 | 10/2000 |

OTHER PUBLICATIONS

International Search Report dated Jul. 8, 2009 for International Application No. PCT/IN2008/000758.

* cited by examiner

MULTI-LAYER FLEXIBLE SHEET AND METHOD THEREOF

TECHNICAL FIELD OF THE INVENTION

The present invention generally relates to multi layer flexible sheet to be used for containers, tubes etc. for packaging and dispensing paste, Gel and Cream type products.

BACKGROUND OF THE INVENTION

Metal foils have long been used for manufacturing containers and tubes for packaging and dispensing various products, including paste, Gel and Cream type products. Such containers and tubes have frequently been made from a single foil layer. However, containers and tubes made from metal foil have had several disadvantages compared to containers made of plastic. Metal tubes tend to dent and deform more readily, crack with a moderate amount of flexure, often react with the filled product and they are more expensive.

More recently, a large share of the tube market has been taken by flexible sheet structure materials having a multiplicity of polymeric layers. Typically, such tubes have an inner heat sealable layer, an outer heat sealable layer, and a barrier layer interposed therebetween. Additional layers may be used in conventional structures to provide other properties or qualities.

Layers of a non-polymeric nature, such as paper and thin metal foils, may also be included in these sheet materials to provide specialized performance functions. It is known, for example, to provide a layer of thin aluminum foil as a high quality barrier layer and luster. When foil is used, it is common practice to use a highly adherent polymer to adhere the foil to its adjacent layers.

However, Aluminum foil layer is considered as foreign material in the plastic multilayer and therefore not eco-friendly. On the other hand, commonly available metalized such as film base laminate Polyester, Polypropylene, polyamide, polyethylene consists of usage of pre-metalized polyester or polypropylene film and, sandwiching and laminating metalized film with inner and outer thermoplastic film such as low density polyethylene, linear low density polyethylene, co-polymer of ethylene. However, these metalized film base laminate gets delaminated at metal and film interface thereby having problems in stability.

Also, today, surface gloss or luster effect plays an important role in marketing the product. However, tubes find in the market are not more lustrous as surface gloss of these presently available multi-layer metal sheets used for tubes for packaging and dispensing the product is less than about 250 at an angle of 20° measured by Gloss meter and conforming to ASTM D-523.

SUMMARY OF THE INVENTION

It is an object of the present invention to provide a multi layer flexible sheet to be used for containers, tubes etc. for packaging and dispensing paste type products solving atleast one of the above mentioned problems.

It is further object of the invention to provide a method for producing the same. In one embodiment, the present invention provides a method for manufacturing a multi-layer flexible sheet comprising steps of metalizing atleast one of the surfaces of a core polymer layer; priming the metalized surface of the core polymer layer with a primer; extrusion laminating the primed surface of the core polymer layer with polyolefin and/or co-polymer of polyolefin; and co-extruding first heat sealable layer over the extrusion laminated layer.

According to the present invention the method also include a step of plasma treating atleast the core polymer layer prior to metalizing the plasma treated layer of the core polymer layer.

The method includes further step of priming of non-metalized of the core layer of the multi layer sheet and extrusion coating the said primed surface with a second heat sealable layer after the co-extruding first heat sealable layer; or priming atleast one of the polymer side of the core layer of the multilayer sheet and extrusion coating with a second heat sealable layer prior to or after metalizing the core polymer layer.

In another embodiment, the present invention provides multilayer flexible sheet comprising a core layer having one of the polymer sides plasma treated, a metal layer deposited on the plasma treated side of the core layer, a primer layer applied on the metalized surface of the core layer, an extrusion polymer lamination layer of polyolefin and/or co-polymer of polyolefin and a heat sealable layer on the extrusion polymer lamination layer.

The multilayer flexible sheet of present invention also comprises a second heat sealable layer coextruded on the polymer side of the core polymer layer along with a primer and extrusion layer.

According to the present invention, the second heat sealable layer is a high clarity polymer selected from a group of metallocene linear low density polyethylene, blend of linear low density polyethylene and low density polyethylene, blend of metallocene low density polyethylene and low density polyethylene etc. which increases glossiness thereby increasing lustrous effect of the sheet.

According to the present invention the primer in combination with the extrusion polymer lamination layer forms a tight bonding between the metalized surface of the core layer and the heat sealable layer.

BRIEF DESCRIPTION OF THE DRAWINGS

The accompanying figures together with the detailed description below are incorporated in and form part of the specification serve further illustrate various embodiments and to explain various principles and advantages all in accordance with the present invention.

DETAILED DESCRIPTION OF THE INVENTION

In general, the present invention provides a method for manufacturing a multilayer flexible sheet and a multilayer flexible sheet.

The method for manufacturing a multilayer sheet comprises steps of metalizing atleast one of the surfaces of a core polymer layer; priming the metalized surface of the core polymer layer with a primer; extrusion laminating the primed surface of the core polymer layer with polyolefin and/or co-polymer of polyolefin; and co-extruding first heat sealable layer over the extrusion laminated layer.

The method of the present invention may comprise further steps of priming of non-metalized or polymer side of the core layer of the multilayer sheet and extrusion coating with an outer layer. Alternatively the method may comprise priming non-metalized or polymer side of the core layer of the multilayer sheet and extrusion coating with an outer layer before the priming of the metalized layer of the core layer.

Figure 1:
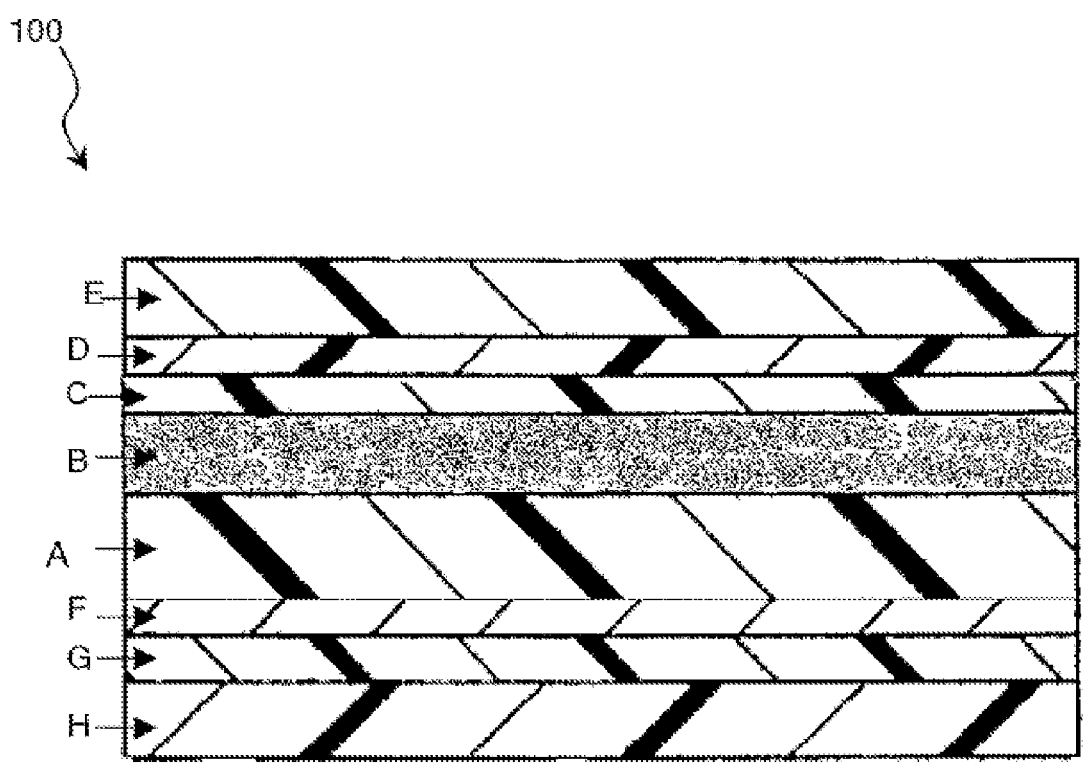
FIG. 1 is a cross sectional view of a multilayer sheet structure of a preferred embodiment of the present invention.

In general, a multilayer polymer sheet of the present invention atleast comprises a core layer having one of the polymer sides plasma treated, a metal layer deposited on the plasma treated side of the core layer, a primer layer applied on the metalized surface of the core layer, an extrusion polymer lamination layer of polyolefin and/or co-polymer of polyolefin and a heat sealable layer on the extrusion polymer lamination layer Referring to FIG. 1 which shows the multilayer flexible sheet (100) according to the present invention, comprising an heat sealable layer (H), a core layer (A) having one surface side bonded with the heat sealable layer (H) with an extrusion layer (G) and a primer (F), a metalized layer (B) on another surface side of the core polymer layer, a primer layer (C) on the metalized surface, an extruded polymer lamination layer (D) of polyolefin and/or co-polymer of polyolefin, and a heat sealable layer (E).

Figure 2:
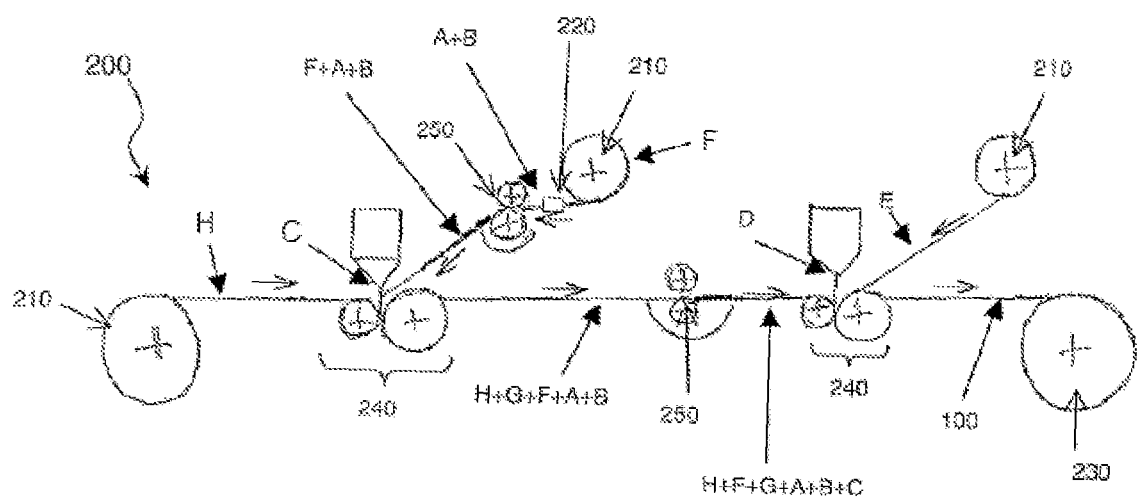
FIG. 2 is a flow chart of one of the preferred methods of manufacturing of a multilayer sheet structure of the present invention.

FIG. 2 shows a flow chart of a method for manufacturing the multi layer sheet according to preferred embodiment of the present invention. The method is carried out on a system (200) which is a rearrangement of conventionally known system which generally comprises un-winders (210) and winder (230), plasma treating system and vacuum metalizer (220), Extrusion coating and laminating units (240) with inline electronic and priming units (250), multi slitter (not shown), surface and/or reverse printing press (not shown).

As shown in FIG. 2, a core polymer layer (A) is un-winded from a un-winder. According to the present invention one of the sides of the core polymer layer (A) is plasma treated and then subjected to metallization to form a metallic layer (B) on the plasma treated side of the core polymer layer while a primer layer (F) is applied on the other side of the core polymer layer (H) (herein after referred to as outer layer). Simultaneously, a second heat sealable layer (A) is un-winded and extruded with the polymer side layer of the core polymer layer on the primer (F). As shown in FIG. 2, a primer (C) is then applied on the metalized layer (B) and then extruded with polyolefin or co-polymer of polyolefin (D) which is then further coextruded with the first heat sealable layer (E) (herein after referred to as inner layer). Alternatively, priming of non-metalized of the core layer of the multi layer sheet and extrusion coating the said primed surface with outer layer can be done after the co-extruding inner layer or before metallization of the core layer.

According to an embodiment of the invention, the method may comprise step of printing of outer layer before extrusion laminated over the polymer side of the core member.

According to the present invention, the core polymer layer of the multi layer sheet comprises at least three layers of polymer sheet selected from the group which includes Polyester, Biaxially oriented Polypropylene, Cast Polypropylene, High Density Polyethylene, Ethylene vinyl alcohol, Polyamide, and skin layers of grafted co-polymer of ethylene, random co-polymer of propylene or thermoplastic elastomers made of either chemical coating or co-extrusion coating.

According to the present invention, the second heat sealable layer is a high clarity polymer selected from a group of metallocene linear low density polyethylene, blend of linear low density polyethylene and low density polyethylene, blend of metallocene low density polyethylene and low density polyethylene etc which increases glossiness thereby luster of the sheet.

According to the present invention the metal is deposited on the core polymer by a well know vacuum deposition method layer to an optical density of about ranging from 1.5 to 2.8. Generally, metal to be deposited is selected from a group including Aluminum, alloys of Aluminum, Copper, Silver, Gold and preferable metal for deposition according to the present invention is Aluminum. According to the present invention, the primer used for the both side of the core layer may be same or different. The primer in combination with the extruded polyolefin or copolymer of polyolefin forms a tight bonding between the metalized surface of the core layer and the inner layer. The primer is selected from a group which includes two component polyurethane, partially crossed linked acrylic co-polymers and the like. Preferable primer to achieve tight bonding according to the present invention is two component polyurethane. According to the present invention, the inner layer and the outer layer of the multilayer are multilayered thermo-plastic film made up of at least 3 layers of the thermoplastic film and minimum thickness of about 25 micron.

According to the present invention, the inner layer comprises 5-9 layers of co-extruded barrier thermoplastic film.

According to the present invention, the outer layer comprises 3-5 layers of thermoplastic film.

According to the present invention, interlayer bond strength of the inner layer and outer layer is equal to or more than 0.3 kg per 15 mm laminate strip. The multi-layer flexible sheet of the present invention is about 100-500 micron thick and has surface gloss more than 250 at an angle of 20° measured by Gloss meter conforming to ASTM D-523. Generally, the multi-layer flexible sheet of the present invention has surface gloss more than 500 at an angle of 20° measured by Gloss meter conforming to ASTM D-523. Therefore the tubes made from the sheets of the present invention have more lustrous look than presently available tubes made of the metal foils.

The following example illustrates the process of the invention in greater details, but, does not limit the present invention in any manner to the specific embodiments as presented therein:

EXAMPLE 1

A multilayer flexible sheet was prepared by plasma treating one of the sides of the core polyester and vacuum metalized the plasma treated side. The primer 'two component polyurethane' was applied on the metalized layer and polyolefin was extrusion laminated over the primer and then inner heat sealable layer of Polyethylene was coextruded over the polyolefin layer. The polymer side of the core polyester was also coextruded along with primer and extrusion. The gloss value was measured from the polymer side of the core layer i.e. from the outer layer at an angle of 20° measured by Gloss meter conforming to ASTM D-523. The details of the multilayer sheet are given as below:

| SR No. | Layers (in order) of Multilayer sheet | | Interlayer bond strength | Gloss value |
|---|---|---|---|---|
| 1. | Outer layer of Highly clear Poly Ethylene of 3 layer | Thickness = 70 micron | ≥500 g/ 15 mm, at 125 mm/mic Cross head speed and 90 deg. Peel angle | ≥700 |
| 2. | Extruded LDPE polymer | Thickness = 29 micron | | |
| 3. | Primer | | | |
| 4. | Polyester bi-axially oriented core | Thickness = 12 micron | | |
| 5. | Aluminum vacuum Metalized layer | Optical density ≥2.0 | | |

| SR No. | Layers (in order) of Multilayer sheet | Interlayer bond strength | Gloss value |
|---|---|---|---|
| 6. | Primer 'two component polyurethane' | | |
| 7. | Multilayer co-extruded Polyolefin extrusion layer | Thickness = 79 micron and Haze value ≤6 | |
| 8. | Inner heat sealable polyethylene layer of 3 layers | Thickness = 100 micron | |

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention under the description of the invention with the accompanying figures, but that the invention will include all embodiments falling within the scope of the appended claims:

What is claimed is:

1. A multi-layer flexible sheet comprising:
a core polymer layer having a first side and a second side, wherein the first side is plasma treated;
a metal layer deposited on the plasma treated side of the core polymer layer to an optical density of at least 1.5;
a first primer layer applied on the metalized surface of the core polymer layer, wherein the first primer layer is selected from a group consisting of two component polyurethane and a crossed linked acrylic co-polymer;
a first extrusion polymer lamination layer of at least one of polyolefin and co-polymer of polyolefin applied on the first primer layer;
a first heat sealable layer extruded on the first extrusion polymer lamination layer;
a second primer layer applied on the second side of the core polymer layer;
a second extrusion polymer lamination layer of at least one of polyolefin and co-polymer of polyolefin applied on the second primer layer; and
a second heat sealable layer extruded on the second extrusion polymer lamination layer, wherein the multi-layer flexible sheet has a surface gloss of greater than 250 measured at 20° over the second heat sealable layer in accordance to ASTM D-523.

2. The multi-layer flexible sheet as claimed in claim 1, wherein the optical density of the metal layer over the core polymer layer ranges from about 1.5 to 2.8.

3. The multi-layer flexible sheet as claimed in claim 1, wherein the core polymer layer comprises at least three layers of polymer selected from a group consisting of Polyester, Biaxially oriented Polypropylene, Cast Polypropylene, High Density Polyethylene, Ethylene vinyl alcohol, and Polyamide, wherein the core polymer layer further comprises two skin layers of at least one of a grafted co-polymer of ethylene, a random co-polymer of propylene and thermoplastic elastomers, and wherein the two skin layers are made by either chemical coating or co-extrusion coating.

4. The multi-layer flexible sheet as claimed in claim 1, wherein interlayer bond strength of the multi-layer flexible sheet between each of the layers is at least 0.3 Kg per 15 mm strip.

5. The multi-layer flexible sheet as claimed in claim 1, wherein the multi-layer flexible sheet has a total thickness in the range of about 100 to 500 micron.

6. The multi-layer flexible sheet as claimed in claim 1, wherein the multi-layer flexible sheet has surface gloss of more than 500 measured at 20° in accordance to ASTM D-523.

7. The multi-layer flexible sheet as claimed in claim 1, wherein the first heat sealable layer comprises at least three layers of co-extruded barrier thermoplastic.

8. The multi-layer flexible sheet as claimed in claim 1, wherein the second heat sealable layer comprises at least three layers of co-extruded barrier thermoplastic.

9. The multi-layer flexible sheet as claimed in claim 1, wherein the second heat sealable layer is a polymer selected from a group consisting of:
metallocene linear low density polyethylene;
a blend of linear low density polyethylene and low density polyethylene; and
a blend of metallocene low density polyethylene and low density polyethylene.

10. The multi-layer flexible sheet as claimed in claim 1, wherein metal in the metal layer is selected from a group consisting of Aluminum, alloys of Aluminum, Copper, Silver, and Gold.

11. The multi-layer flexible sheet as claimed in claim 1, configured as one of a container or a tube, for packaging and dispensing a paste type product.

12. The multi-layer flexible sheet as claimed in claim 1, wherein the interlayer bond strength between each of the layers is at least 500 g per 15 mm strip.

13. A multi-layer flexible sheet comprising:
a core polyester layer having a first side and a second side, wherein the first side is plasma treated;
a metal layer deposited on the plasma treated side of the core polyester layer to an optical density of at least 1.5;
a first primer layer applied on the metalized surface of the core polyester layer, wherein the first primer layer comprising a two-component polyurethane;
a first extrusion polymer lamination layer comprising at least one of a polyolefin and a co-polymer of polyolefin applied on the first primer layer;
a first heat sealable layer comprising polyethylene, the first heat sealable layer being extruded on the first extrusion polymer lamination layer;
a second primer layer applied on the second side of the core polyester layer, the second primer layer comprising a two-component polyurethane;
a second extrusion polymer lamination layer comprising low density polyethylene applied on the second primer layer; and
a second heat sealable layer extruded on the second extrusion polymer lamination layer, wherein the second heat sealable layer comprises polyethylene;
wherein the multi-layer flexible sheet has a surface gloss of greater than 250 measured at 20° over the second heat sealable layer in accordance to ASTM D-523;
wherein interlayer bond strength between each of the layers is at least 0.3 Kg per 15 mm strip.

14. The multi-layer flexible sheet as claimed in claim 13, wherein the multi-layer flexible sheet has a total thickness in the range of about 100 to 500 micron.

15. The multi-layer flexible sheet as claimed in claim 13, wherein the multi-layer flexible sheet has surface gloss of more than 500 measured at 20° in accordance to ASTM D-523.

16. The multi-layer flexible sheet as claimed in claim 13, wherein the second heat sealable layer is a polymer selected from a group consisting of:
- metallocene linear low density polyethylene;
- a blend of linear low density polyethylene and low density polyethylene; and
- a blend of metallocene low density polyethylene and low density polyethylene.

17. The multi-layer flexible sheet as claimed in claim 13, wherein metal in the metal layer is selected from a group consisting of Aluminum, alloys of Aluminum, Copper, Silver, and Gold.

18. The multi-layer flexible sheet as claimed in claim 13, wherein the interlayer bond strength between each of the layers is at least 500 g per 15 mm strip.

19. The multi-layer flexible sheet as claimed in claim 13, configured as one of a container or a tube, for packaging and dispensing a paste type product.

\* \* \* \* \*